United States Patent [19]

Satomura

[11] Patent Number: 5,451,943
[45] Date of Patent: Sep. 19, 1995

[54] DATA RECORDING METHOD AND DATA RECORDING APPARATUS USING A DIGITAL SUM VALUE OF A CODED SIGNAL

[75] Inventor: Seiichiro Satomura, Yokohama, Japan

[73] Assignee: Canon Kabushiki Kaisha, Tokyo, Japan

[21] Appl. No.: 172,102

[22] Filed: Dec. 23, 1993

[30] Foreign Application Priority Data

Dec. 28, 1992 [JP] Japan ................... 4-347824

[51] Int. Cl.⁶ ........................................... H03M 7/00
[52] U.S. Cl. ........................................ 341/58; 341/59
[58] Field of Search ................. 341/50, 58, 59, 68–73

[56] References Cited

U.S. PATENT DOCUMENTS

| | | | |
|---|---|---|---|
| 4,451,819 | 5/1984 | Beckenhauer | 341/59 |
| 4,567,464 | 1/1986 | Siegel et al. | 341/59 |
| 4,571,575 | 2/1986 | McCullough | 341/59 |
| 4,697,167 | 9/1987 | O'Keeffe et al. | 341/59 |
| 4,860,324 | 8/1989 | Satomura | 375/122 |
| 4,975,916 | 12/1990 | Miracle et al. | 371/47.1 |
| 5,231,545 | 7/1993 | Gold | 360/49 |
| 5,327,124 | 7/1994 | Funamoto | 341/58 |

FOREIGN PATENT DOCUMENTS

| | | |
|---|---|---|
| 0420179 | 4/1991 | European Pat. Off. . |
| 62-272726 | 11/1987 | Japan . |
| 63-160422 | 7/1988 | Japan . |
| 2227880 | 9/1990 | Japan . |
| WO8501402 | 3/1985 | WIPO . |

OTHER PUBLICATIONS

C. Shinn, II, "Charge Constrained (1,7) Code for Magneto Optic Recording", Topical Meeting on Optical Data Storage, pp. 115–117 (Mar. 1987).

"Fault-Tolerant Sync Byte for Run-Length-Limited Codes", IBM Technical Disclosure Bulletin, vol. 20, No. 1, pp. 151–157 (Jun. 1986).

*Primary Examiner*—Marc S. Hoff
*Attorney, Agent, or Firm*—Fitzpatrick, Cella, Harper & Scinto

[57] ABSTRACT

A method of recording data in a recording medium is performed by using an RLL (Run Length Limited) Code represented by $(d,k,m,n)=(1,7,2,3)$. When it is assumed that X is an indeterminate bit which is determined by the data, a one-byte resync signal with a pattern represented by "X01000000001" is periodically inserted into the data. Then, the data into which the resync signal is inserted is recorded on the recording medium. A method of recording data in a recording medium in accordance with NRZI (Non Return to Zero Inverted) recording is performed by using an RLL code represented by $(d,k,m,n)=(1,7,2,3)$. When it is assumed that X is an indeterminate bit which is determined by the data, one of one-byte resync signals represented by patterns "X01000000001" and "X01000000101" is selected such that a DSV (Digital Sum Value) of a coded signal is decreased. The selected resync signal is periodically inserted into the data. Then, the data into which the resync signal is inserted is recorded on the recording medium.

6 Claims, 8 Drawing Sheets

FIG. 1
PRIOR ART

| INPUT BIT | CHANNEL BIT |
|---|---|
| 0 1 | x 0 0 |
| 1 0 | 0 1 0 |
| 1 1 | x 0 1 |
| 0 0 0 1 | x 0 0 0 0 1 |
| 0 0 1 0 | x 0 0 0 0 0 |
| 0 0 1 1 | 0 1 0 0 0 1 |
| 0 0 0 0 | 0 1 0 0 0 0 |

FIG. 9

| DSV0→n \ DSVn+1 | POSITIVE OR 0 | NEGATIVE |
|---|---|---|
| POSITIVE OR 0 | $Z_n$ = "1" INVERSION | $Z_n$ = "0" NOT INVERSION |
| NEGATIVE | $Z_n$ = "0" NOT INVERSION | $Z_n$ = "1" INVERSION |

FIG. 3
PRIOR ART

| COLUMN NUMBER (j) | 0 | 1 | 2 | 3 | 4 | 5 | 6 | 7 | 8 | 9 | COLUMN NUMBER (i) |
|---|---|---|---|---|---|---|---|---|---|---|---|
| SB1-3 | D1 | D2 | D3 | D4 | D5 | D6 | D7 | D8 | D9 | D10 | 102 |
|  | D11 | D12 | D13 | D14 | D15 | D16 | D17 | D18 | D19 | D20 | 101 |
| RS1 | D21 | D22 | D23 | D24 | D25 | D26 | D27 | D28 | D29 | D30 | 100 |
|  | D31 | D32 | D33 | D34 | D35 | D36 | D37 | D38 | D39 | D40 | 99 |
| RS2 | D41 | D42 | D43 | D44 | D45 | D46 | D47 | D48 | D49 | D50 | 98 |
|  | D51 | D52 | D53 | D54 | D55 | D56 | D57 | D58 | D59 | D60 | 97 |
| RS3 | D61 | D62 | D63 | D64 | D65 | D66 | D67 | D68 | D69 | D70 | 96 |
| RS49 | D981 | D982 | D983 | D984 | D985 | D986 | D987 | D988 | D989 | D990 | 4 |
|  | D991 | D992 | D993 | D994 | D995 | D996 | D997 | D998 | D999 | D1000 | 3 |
| RS50 | D1001 | D1002 | D1003 | D1004 | D1005 | D1006 | D1007 | D1008 | D1009 | D1010 | 2 |
|  | D1011 | D1012 | D1013 | D1014 | D1015 | D1016 | D1017 | D1018 | D1019 | D1020 | 1 |
| RS51 | D1021 | D1022 | D1023 | D1024 | A1 | A2 | C1 | C2 | C3 | C4 | 0 |
|  | E1,1 | E2,1 | E3,1 | E4,1 | E5,1 | E6,1 | E7,1 | E8,1 | E9,1 | E10,1 | -1 |
| RS52 | E1,2 | E2,2 | E3,2 | E4,2 | E5,2 | E6,2 | E7,2 | E8,2 | E9,2 | E10,2 | -2 |
|  | E1,3 | E2,3 | E3,3 | E4,3 | E5,3 | E6,3 | E7,3 | E8,3 | E9,3 | E10,3 | -3 |
| RS58 | E1,14 | E2,14 | E3,14 | E4,14 | E5,14 | E6,14 | E7,14 | E8,14 | E9,14 | E10,14 | -14 |
|  | E1,15 | E2,15 | E3,15 | E4,15 | E5,15 | E6,15 | E7,15 | E8,15 | E9,15 | E10,15 | -15 |
| RS59 | E1,16 | E2,16 | E3,16 | E4,16 | E5,16 | E6,16 | E7,16 | E8,16 | E9,16 | E10,16 | -16 |

103 COLUMNS

16 COLUMNS

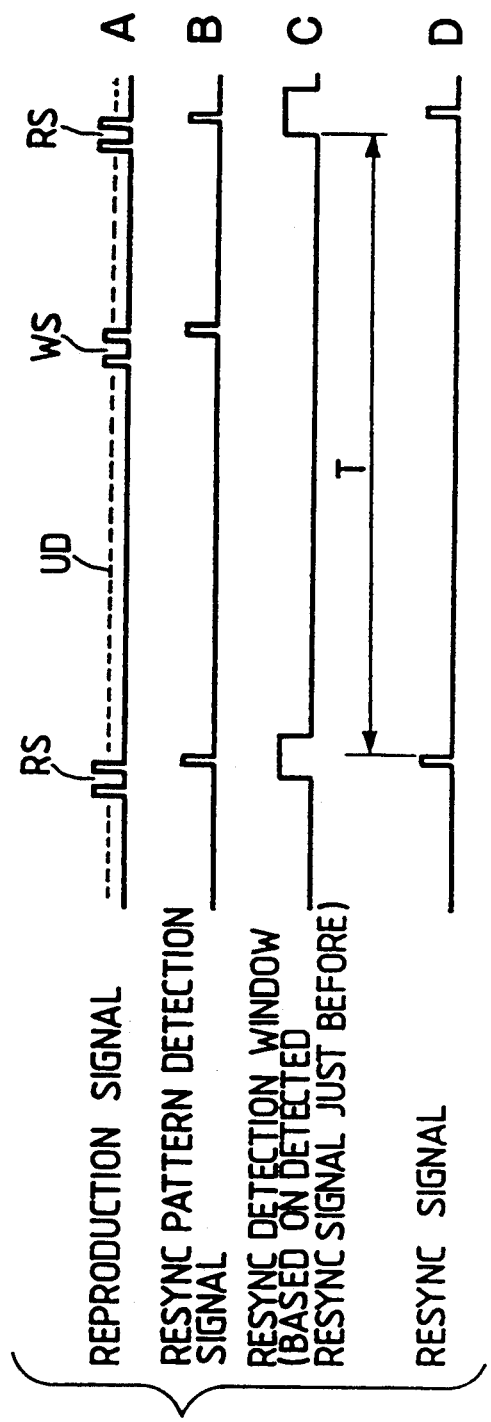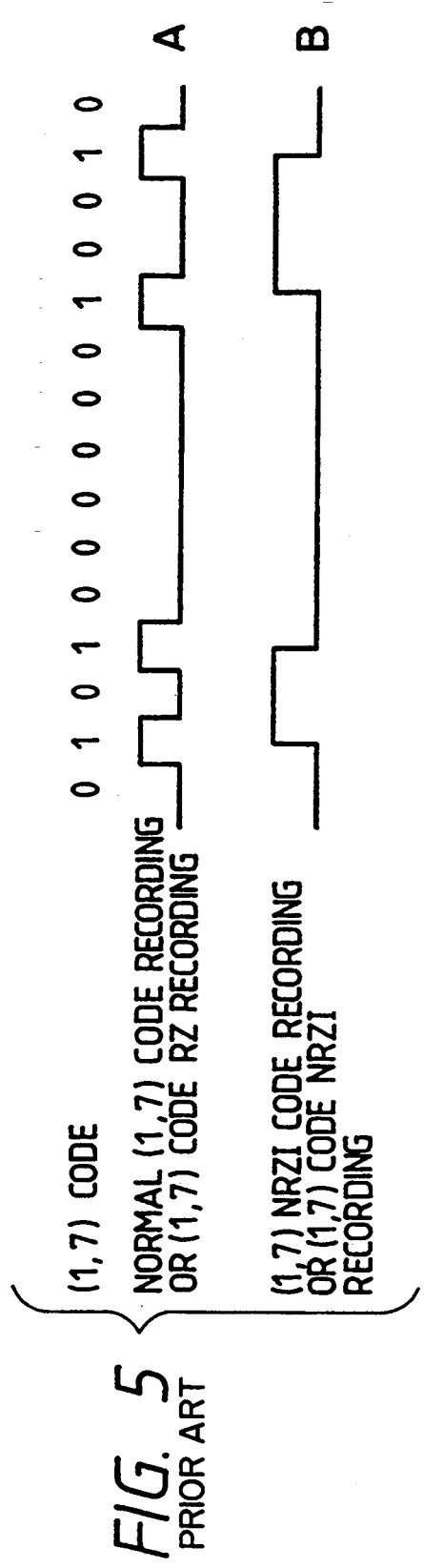
FIG. 4 PRIOR ART
FIG. 5 PRIOR ART

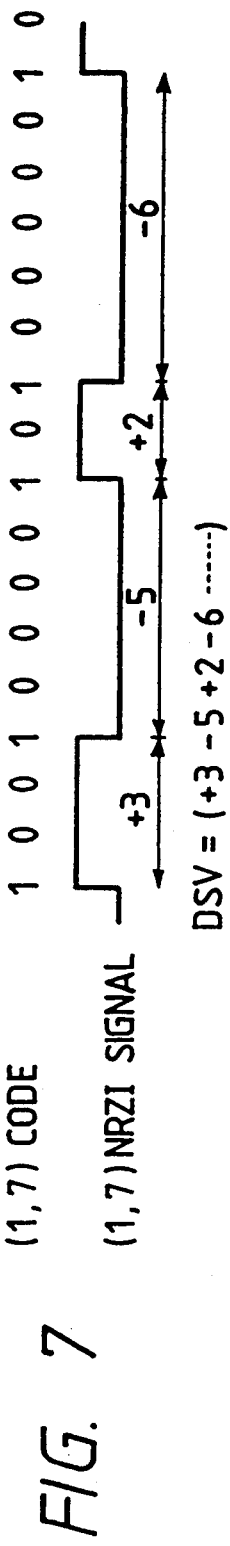
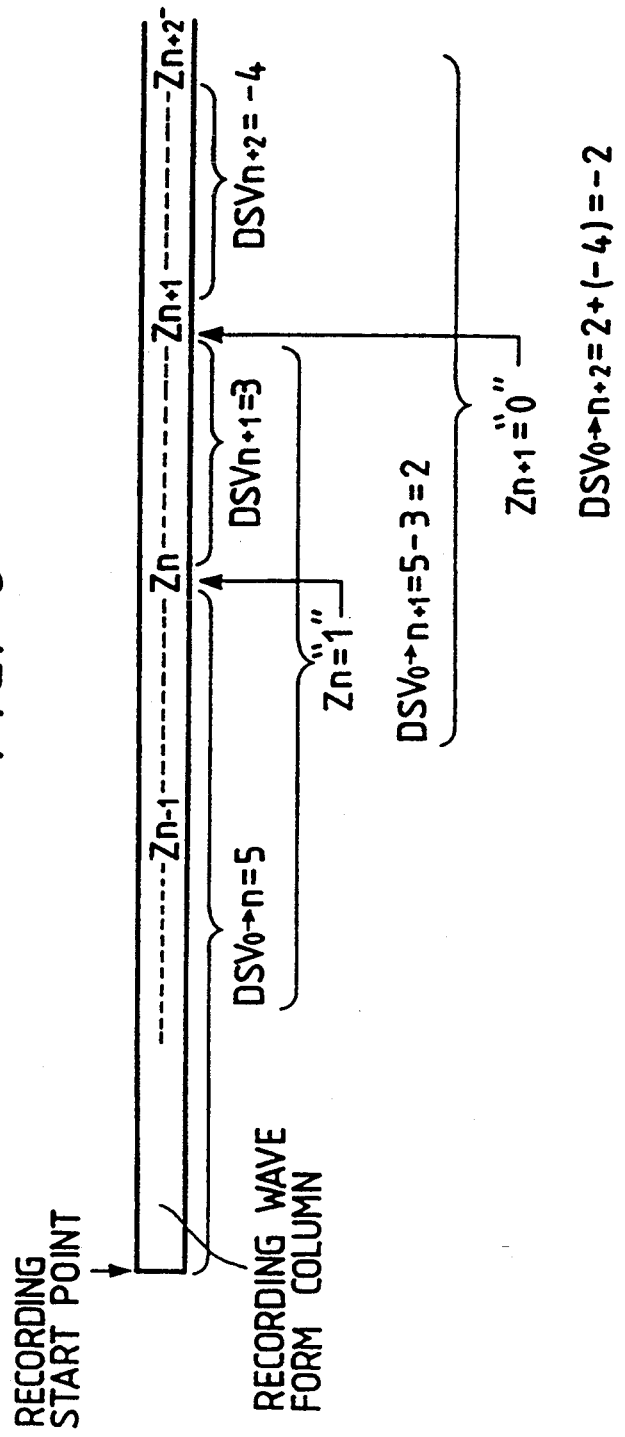
FIG. 7
FIG. 8

DATA RECORDING METHOD AND DATA RECORDING APPARATUS USING A DIGITAL SUM VALUE OF A CODED SIGNAL

BACKGROUND OF THE INVENTION

1. Field of the Invention

The present invention relates to a data recording method and a data recording apparatus for coding data by using a so-called (1,7) code and recording the data into a recording medium.

2. Related Background Art

FIG. 1 shows a coding table of the most common (1,7) code. In this code, (d,k,m,n)=(1,7,2,3), i.e., the number of "0"s present between "1"s is a minimum of one and a maximum of seven, and the conversion bit ratio is 2:3. In this table, X represents an indeterminate bit which is determined by the pattern before this bit.

FIG. 2 illustrates a sector format proposed as a standard of a rewritable 300-mm optical disk, as an example of a sector format using this (1,7) code. Referring to FIG. 2, a 67-byte portion as a header field is an area in which address information is already recorded on a disk, and a 1,293-byte portion as a recording field is an area in which new information is recorded. FIG. 3 explains in detail a 3-byte DS portion and a 1,249-byte data field portion in that area.

The data field shown in FIG. 3 contains a data sync pattern SB1-3 which indicates the start position of data, user data D1 to D1024, address data A1 and A2, CRC parities (error-detecting codes) C1 to C4, ECC parities (error-correcting codes) E1,1 to E10,14, and resync (resynchronization) patterns RS1 to RS59. These patterns, data, and parities are coded and recorded by the (1,7) code described above.

The purpose of the resync pattern is to record a predetermined pattern at a fixed period. That is, if a large omission of data takes place in a reproduction signal during reproduction, this shifts the phase of a reproduction phase locked loop (PLL) clock, making byte synchronization of reproduction information impossible. Even if this synchronization difference propagates, it is possible to perform resynchronization by detecting the resync pattern and thereby minimize the damage.

The one-byte resync pattern proposed in this standard is a pattern "X01000001000" which is obtained by converting "C5" into the (1,7) code in hexadecimal notation.

It is desirable that the resync pattern be a pattern which does not appear in user data. If the same pattern as the resync pattern appears in user data, a resync pattern detection circuit erroneously detects the resync pattern, producing a large error in reproduction data. To prevent this, windows for detecting the resync pattern can be provided in intervals before and after a point at which the resync pattern is expected to be detected, thereby making it impossible to detect the resync pattern in a data area.

FIG. 4 is a timing chart for explaining the function of such a resync detection window. Referring to FIG. 4, RS represents a true resync signal, UD represents user data, WS represents a false resync signal in the user data, and T represents a fixed time.

Assume that the window is narrowed so as not to erroneously detect the false resync pattern in the user data area. In this case, if an omission of data occurs in a reproduction signal, the resync pattern may fall outside the window due to an error in the frequency of the reproduction signal and therefore may no longer be detected. If, in contrast, the window is widened so as not to miss the true resync pattern, the false resync pattern in the user data area may be erroneously detected.

For this reason, the standard of a rewritable optical disk using a (2,7) code, for example, makes use of a pattern, which satisfies a (2,7) limitation, i.e., "0010000000100100," and does not appear in a data area written by the (2,7) code, as the resync pattern. The above-mentioned resync pattern of the (1,7) code, however, is a pattern that appears in the user data area.

A pattern indicated by "1000000010000001," therefore, which satisfies the (d,k) limitation of (1,7) is used. Such a pattern in which an 8-t period is followed by a 7-t period meets the condition (d,k)=(1,7) and does not appear in the (1,7)-code coding table mentioned earlier. The use of this pattern as the resync pattern can solve the above problem. If, however, this pattern is used, the resync pattern consists of at least two bytes. In FIG. 3, a resync pattern of one byte is added every 20 bytes of user data. The efficiency of recording capacity decreases if a resync pattern of two bytes must be added every 20 bytes of user data.

Another problem on which the present invention has focused attention is a problem of DC free of a coded signal. Assuming that symbol 1 is +1 point and symbol is −1 point in a recording waveform column, the sum of points in a given waveform column is termed a digital sum value (DSV). A code in which a DSV in a certain predetermined interval is 0 or has a finite value does not have a DC component in its waveform column and hence is called a DC free code. When this DC free code is used, a binary circuit of a reproducing apparatus can be simplified because no DC component is contained in a reproduction signal. This effectively reduces jitters produced by binary errors.

Examples of the DC free code are PE modulation, FM modulation, a Miller$^2$ (Miller square) code, and an EFM code. These codes, however, have their respective drawbacks, such as a low recording density, a small window margin, and complexity in a coding circuit.

On the other hand, it is also possible to perform mark-edge recording for a run length limited (RLL) code, such as the (1,7) code or the (2,7) code, which is often used in mark-position recording, for the purpose of increasing the recording density. That is, as shown in FIG. 5, it is possible to convert the RLL code into a non return to zero inverted (NRZI) code, thereby using it as a (1,7) NRZI code or a (2,7) NRZI code.

There is a conventionally known method for converting these non DC free codes into DC free codes by providing a DC free control bit at a predetermined period. That is, by properly selecting the DC free control bit provided at the fixed period, a DSV value as a whole can be so controlled as not to be greater than a predetermined value.

SUMMARY OF THE INVENTIQN

The above first problem is solved by a method of recording data into a recording medium by using an RLL code represented by (d,k,m,n)=(1,7,2,3), wherein, assuming that X indicates an indeterminate bit which is determined by the data, a one-byte resync signal having a pattern represented by "X01000000001" is recorded in the medium by periodically inserting the resync signal into the data.

The above second problem is solved by a method of NRZI-recording data into a recording medium by using an RLL code represented by (d,k,m,n)=(1,7,2,3), wherein, assuming that X indicates an indeterminate bit which is determined by the data, a one-byte resync signal having a pattern represented by "X01000000001" or "X01000000101" is so selected as to decrease the digital sum value of a coded signal and recorded in the medium by periodically inserting the resync signal into the data.

Likewise, the above second problem is solved by a method of NRZI-recording data into a recording medium by using an RLL code represented by (d,k,m,n)=(1,7,2,3), wherein, assuming that X indicates an indeterminate bit which is determined by the data, a one-byte resync signal having a pattern represented by "X01000000001" or "X01010000001" is so selected as to decrease the digital sum value of a coded signal and recorded in the medium by periodically inserting the resync signal into the data.

BRIEF DESCRIPTION OF THE DRAWINGS

FIG. 1 is a view showing a coding table for a (1,7) code;

FIG. 3 is a view showing the arrangement of a data field in the sector format shown in FIG. 2;

FIG. 4 is a timing chart for explaining the function of a resync detection window;

FIG. 5 is a timing chart for explaining NRZI recording using the (1,7) code;

FIG. 7 is a timing chart for explaining how to obtain a digital sum value;

FIG. 8 is a view for explaining the function of a DSV determination circuit shown in FIG. 6;

FIG. 9 is a view showing an output table for explaining an output from the DSV determination circuit shown in FIG. 6;

DETAILED DESCRIPTION OF THE PREFERRED EMBODIMENTS

Figure 2:
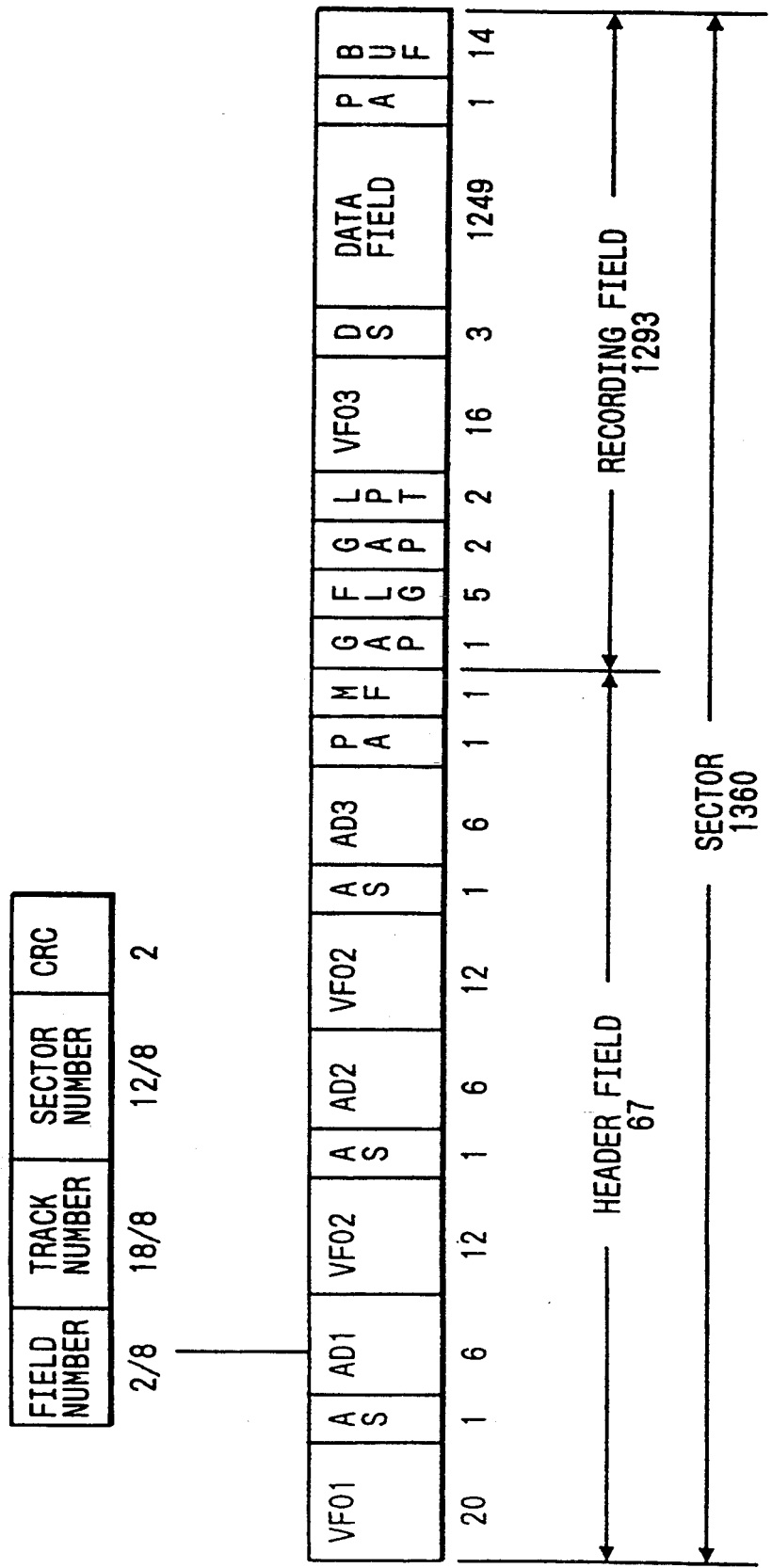
FIG. 2 is a view showing an example of a sector format.
Figure 6:
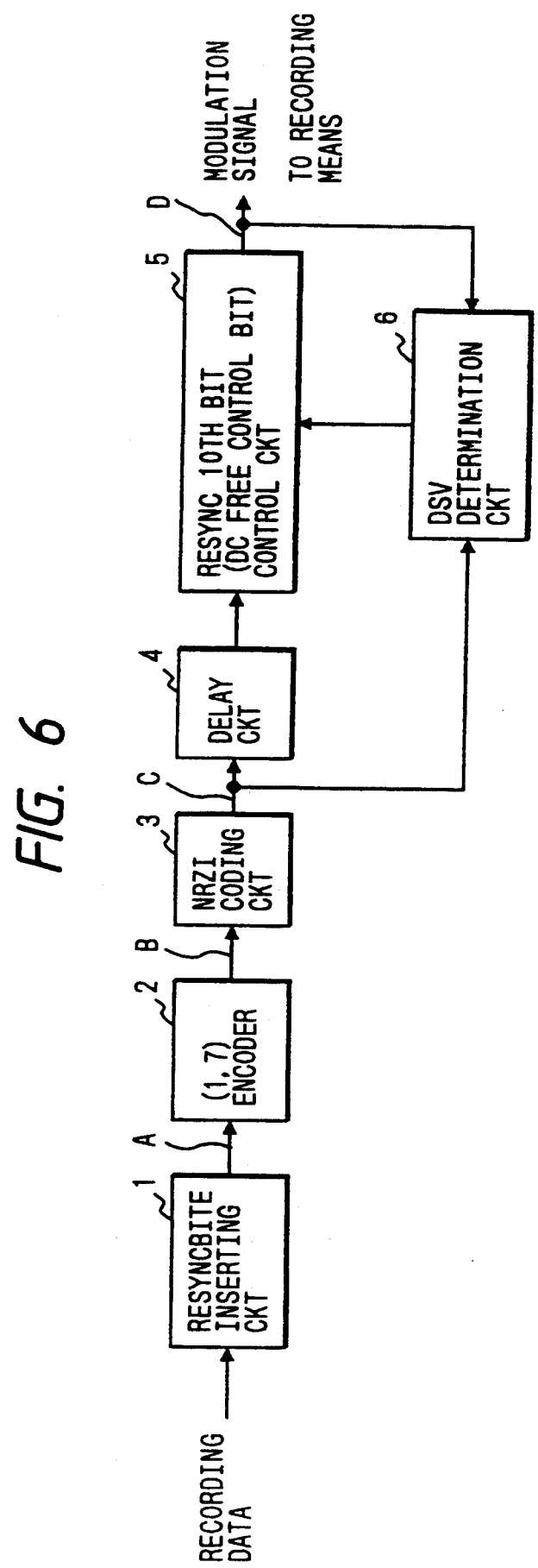
FIG. 6 is a block diagram showing an embodiment of a resync signal generation unit of a data recording apparatus according to the present invention.

FIG. 6 is a block diagram showing one embodiment of a resync signal generation unit of a data recording apparatus according to the present invention. Referring to FIG. 6, this resync signal generation unit includes a resync byte inserting circuit 1, a (1,7) encoder 2, an NRZI coding circuit 3, a delay circuit 4, a resync 10th bit control circuit 5, and a DSV determination circuit 6. In FIG. 6, a resync signal at a point A is "11001011," resync signals at points B and C are "X01000000101," and a resync signal at a point D is "X01000000101" or "X01000000001."

Input recording data shown in FIG. 6 is data illustrated in a portion inside double lines in FIG. 3, i.e., data added with error-correcting codes and error-detecting codes. The resync byte inserting circuit 1 adds a portion from RS1 to RS59 shown in FIG. 3. According to the present invention, hexadecimal data corresponding to a resync byte is "CB," and this one-byte data "CB" is inserted every 20 bytes of input data. The (1,7) encoder 2 performs (1,7) coding for recording data in accordance with the rule determined in FIG. 1. The resulting output resync signal has a pattern "X01000000101." The output from the encoder 2 is converted into an NRZI signal by the NRZI coding circuit 3. That is, the output from the encoder is converted into a signal in which the polarity is inverted at a portion of "1" and remains unchanged at a portion of "0."

The DSV determination circuit 6 counts the DSV of the NRZI waveform column. As shown in FIG. 7, assuming that an interval corresponding to "1" of the NRZI signal is +1 point and an interval corresponding to "0" of the signal is −1 point, this count is obtained by calculating the sum total of these points.

Of one byte of the resync signal, i.e., of 12 channel bits of the signal, the 10th bit is used as a DC free control bit.

Assume that a DSV from a recording start point to a given DC free control bit $Z_n$ is $DSV_{0 \to n}$, and that a DSV in an interval from $Z_n$ to $Z_{n+1}$ is $DSV_{n+1}$. If $DSV_{0 \to n}=5$ and $DSV_{n+1}=3$ for $Z_n$, as shown in FIG. 8, the total DSV is increased if the two DSVs are connected directly since both the DSVs are positive. In this case, therefore, it is preferable to invert the polarity at the bit $Z_n$ to obtain −3 as $DSV_{n+1}$. For this reason, the polarity is inverted by setting "1" as $Z_n$.

For $Z_{n+1}$, it is assumed that $DSV_{0 \to n+1}=2$ and $DSV_{n+2}=-4$. In this case, the polarity of $DSV_{n+2}$ is preferably not inverted, so $Z_{n+1}=$"0" is set. The DSV determination circuit 6 performs these determinations.

FIG. 9 shows an I/O table of the DSV determination circuit 6. If the polarities of $DSV_{0 \to n}$ and $DSV_{n+1}$ are the same, the DSV determination circuit 6 outputs $Z_n=$"1"; if these polarities are different, the DSV determination circuit 6 outputs $Z_n=$"0."

The delay circuit 4 is necessary to cause a modulation signal to wait until the DSV determination circuit 6 outputs the determination result. The delay circuit 4 delays an input signal by a predetermined time by using a FIFO memory or the like and outputs the delayed signal.

Figure 11:
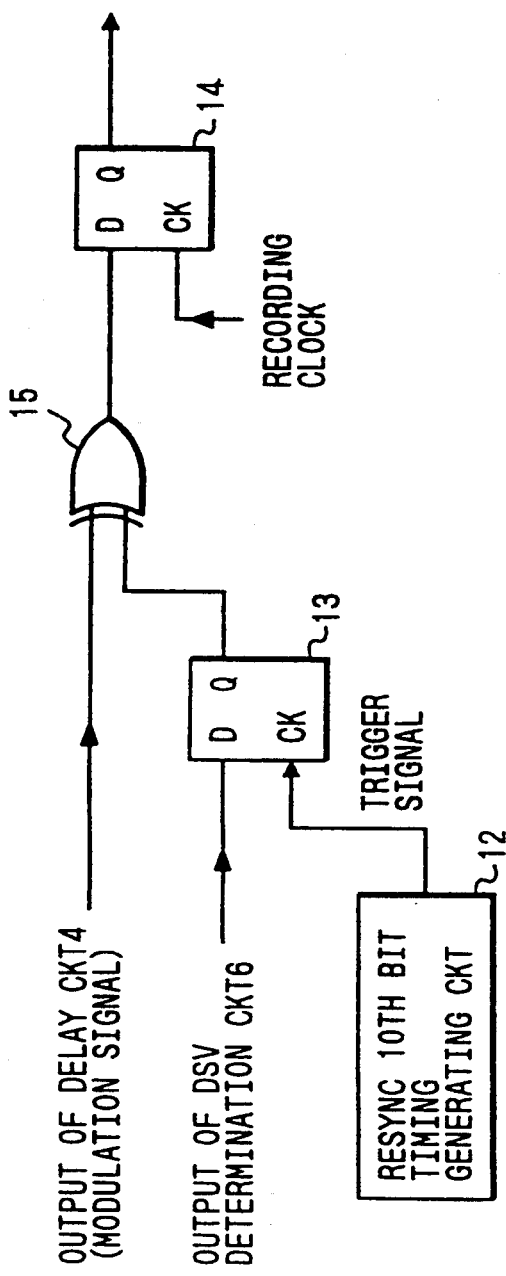
FIG. 11 is a circuit diagram showing an example of the arrangement of a bit control circuit shown in FIG. 6.

The resync 10th bit control circuit 5 is arranged, for example, as shown in FIG. 11. Referring to FIG. 11, this bit control circuit includes a resync 10th bit timing generating circuit 12, flip-flop circuits 13 and 14, and an exclusive-OR gate 15.

The bit control circuit 5 performs control such that, when the output from the DSV determination circuit 6 is "1," the polarity is inverted at the timing of the 10th bit of a resync signal; when the output from the DSV determination circuit 6 is "0," the polarity is not inverted.

When a resync pattern is recorded by using the above means, this resync signal can be recorded as a DC free signal since the maximum value of the sum total of DSVs of a waveform column to be recorded does not exceed the maximum value of DSV in one block.

Figure 10:
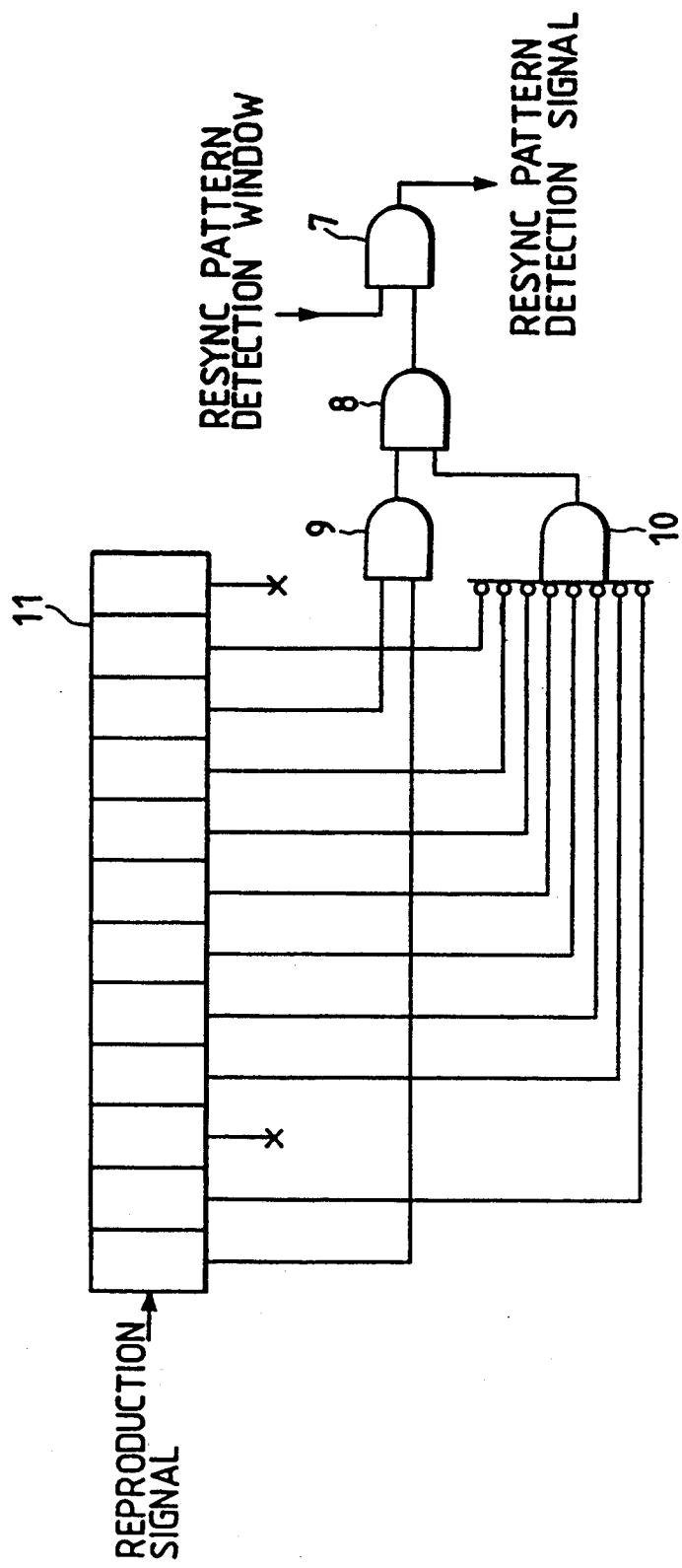
FIG. 10 is a circuit diagram showing an example of the arrangement of a resync signal detection circuit in a reproducing apparatus.

FIG. 10 illustrates an example of the arrangement of a resync pattern detection circuit in a reproducing apparatus. Referring to FIG. 10, this detection circuit includes AND gates 7, 8, and 9, a NOR gate 10, and a 12-bit shift register 11.

The resync pattern detection circuit with the above arrangement performs pattern matching for an input reproduction signal to the shift register 11. Since the 10th bit of this shift register does not take part in this pattern matching, it is possible to detect a pattern of either "X01000000001" or "X01000000101." In addition, in order to prevent detection of a false resync pattern in a user data area, a resync pattern detection window is opened only in the vicinity of a portion where a resync pattern is expected to be detected. Consequently, the AND gate 7 can extract only a true resync pattern.

In mark-position recording or in mark-edge recording requiring no DC free recording, the resync pattern need only be one type, "X01000000001."

Figure 12:
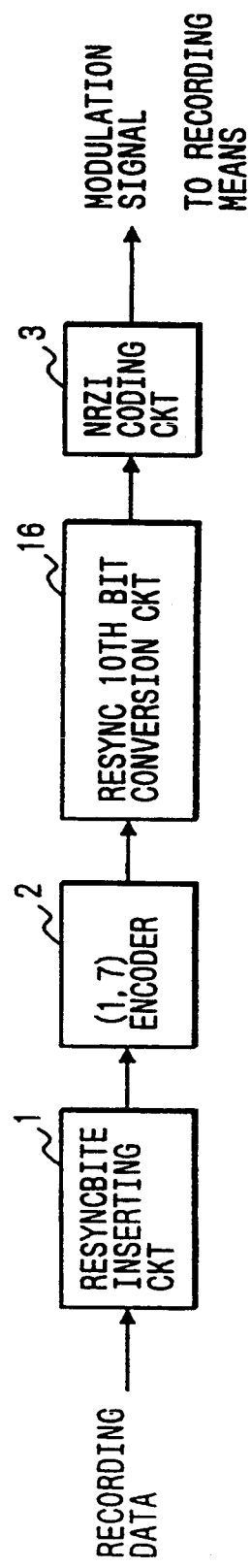
FIG. 12 is a block diagram showing another embodiment of the resync signal generation unit of the data recording apparatus according to the present invention.

In this case, the resync signal generation unit is constituted as shown in FIG. 12. Referring to FIG. 12, a resync 10th bit conversion circuit 16 for converting the 10th bit of a resync signal from "1" to "0" is provided in place of the delay circuit 4, the bit control circuit 5, and the DSV determination circuit 6 shown in FIG. 6. That is, this embodiment makes it unnecessary to use the means for inverting the polarity in a resync portion such as in the embodiment shown in FIG. 6. Instead, after (1,7) coding is performed by inserting a resync byte "CB" hex, it is required to replace "1," the 10th bit of the resync, with "0."

Since this resync pattern does not appear in the (1,7) code, it advantageously decreases the possibility of erroneous detection of the resync pattern in a data area.

It will be understood from the above description that the following patterns also can be used as other embodiments. That is, as the resync pattern to be used in combination with "X01000000001," five patterns of (b) "X01010000001"
(c) "X01001000001"
(d) "X01000100001"
(e) "X01000010001"
(f) "X01000001001" can be used instead of (a) "X01000000101" mentioned earlier. Although any of the above patterns can achieve the object of the present invention, a comparison of these patterns will be made below.

The pattern (b) has performance as a resync pattern equivalent to that of the pattern (a). That is, when the width of a detection window is set at ±6 channel bits in the resync detection circuit, as shown in FIG. 10, no resync pattern erroneous detection occurs even if one channel bit error takes place.

When the pattern (c) or (f) is to be used, the width of a detection window must be set at ±5 channel bits in order that no resync pattern erroneous detection takes place even if one channel bit error occurs. When the pattern (d) or (e) is to be used, the width of a detection window must be set at ±4 channel bits under the same conditions.

As described above, when the width of a resync detection window is narrowed, a detection omission becomes more likely to occur with respect to variations in reproducing rate. When this fact is taken into consideration, the use of the pattern (a) or (b) is desirable.

As has been described above, according to the data recording method and the data recording apparatus of the present invention, a resync pattern of one byte can be set in the (1,7) code, and this improves the efficiency of recording density compared to a two-byte resync pattern. In addition, since recording can be performed in a DC free waveform column, a reproducing apparatus can be designed easily, and jitters upon binarization are also reduced.

Furthermore, when a pattern "X01000001000" of the conventional example, which is obtained by performing (1,7) coding for hexadecimal "C5" is detected by using the resync pattern detection circuit, as shown in FIG. 10, one channel bit error may result in erroneous detection of a false resync signal if a detection window is set at ±6 channel bits. In the present invention, however, even if the detection window is set at ±6 channel bits, erroneous detection of a false resync signal is never caused by one channel bit error.

As described above, the data recording method and the data recording apparatus of the present invention can perform recording and reproduction with a higher reliability.

What is claimed is:

1. A method of recording data in a recording medium in accordance with NRZI recording by using an RLL code represented by (d,k,m,n)=(1,7,2,3), comprising the steps of:
   selecting one of one-byte resync signals represented by patterns "X01000000001" and "X01000000101", assuming that X is an indeterminate bit which is determined by the data, such that a DSV of a coded signal is decreased, and periodically inserting the selected resync signal into the data; and
   recording the data into which the resync signal is inserted into said recording medium.

2. A method of recording data in a recording medium in accordance with NRZI recording by using an RLL code represented by (d,k,m,n)=(1,7,2,3), comprising the steps of:
   selecting one of one-byte resync signals represented by patterns "X01000000001" and "X01010000001", assuming that X is an indeterminate bit which is determined by the data, such that a DSV of a coded signal is decreased, and periodically inserting the selected resync signal into the data; and
   recording the data into which the resync signal is inserted into said recording medium.

3. A data recording method of coding data into which a resync signal is inserted and recording the coded signal in a recording medium, comprising the steps of:
   providing a DC free control bit for removing a DC component from a waveform column of the coded signal in the resync signal;
   determining the control bit by comparing DSVs of the signal before and after the control bit;
   controlling the control bit in accordance with the result of the step of determining the control bit;
   recording the data containing the resync signal in which the control bit is determined into said recording medium; and
   delaying input of the coded signal to the control step until the control bit is determined.

4. An apparatus for recording data in a recording medium in accordance with NRZI recording by using an RLL code represented by (d,k,m,n)=(1,7,2,3), comprising:
   means for selecting one of one-byte resync signals represented by patterns "X01000000001" and "X01000000101", assuming that X is an indeterminate bit which is determined by the data, such that a DSV of a coded signal is decreased, and periodically inserting the selected resync signal into the data; and means for recording the data into which the resync signal is inserted into said recording medium.

5. An apparatus for recording data in a recording medium in accordance with NRZI recording by using an RLL code represented by $(d,k,m,n)=(1,7,2,3)$, comprising:

means for selecting one of one-byte resync signals represented by patterns "X01000000001" and "X01010000001", assuming that X is an indeterminate bit which is determined by the data, such that a DSV of a coded signal is decreased, and periodically inserting the selected resync signal into the data; and means for recording the data into which the resync signal is inserted into said recording medium.

6. A data recording apparatus for converting data into a modulation signal and recording the modulation signal in a recording medium in accordance with a predetermined format, comprising:

control bit determination means for providing a DC free control bit for removing a DC component from a waveform column of the modulation signal every predetermined interval on the format, and determining the control bit by comparing DSVs of the signal before and after the control bit;

bit control means for inserting the control bit determined by said control bit determination means into a predetermined position of the signal; and a delay circuit for delaying the signal until the control bit is determined by said bit control means.

* * * * *

UNITED STATES PATENT AND TRADEMARK OFFICE
CERTIFICATE OF CORRECTION

PATENT NO. : 5,451,943
DATED : September 19, 1995
INVENTOR(S) : Satomura

It is certified that error appears in the above-indentified patent and that said Letters Patent is hereby corrected as shown below:

COLUMN 4:

Line 26, "$DSVO_{0-n} = 5$" should read --$DSV_{0-n} = 5$--.
Line 37, "$DSVO_{0-n}$" should read --$DSV_{0-n}$--.

Signed and Sealed this

Fifth Day of March, 1996

Attest:

BRUCE LEHMAN

Attesting Officer    Commissioner of Patents and Trademarks